Nov. 27, 1934. C. C. HUNICKE 1,982,305
AIR CONDITIONING SYSTEM
Filed Sept. 26, 1932
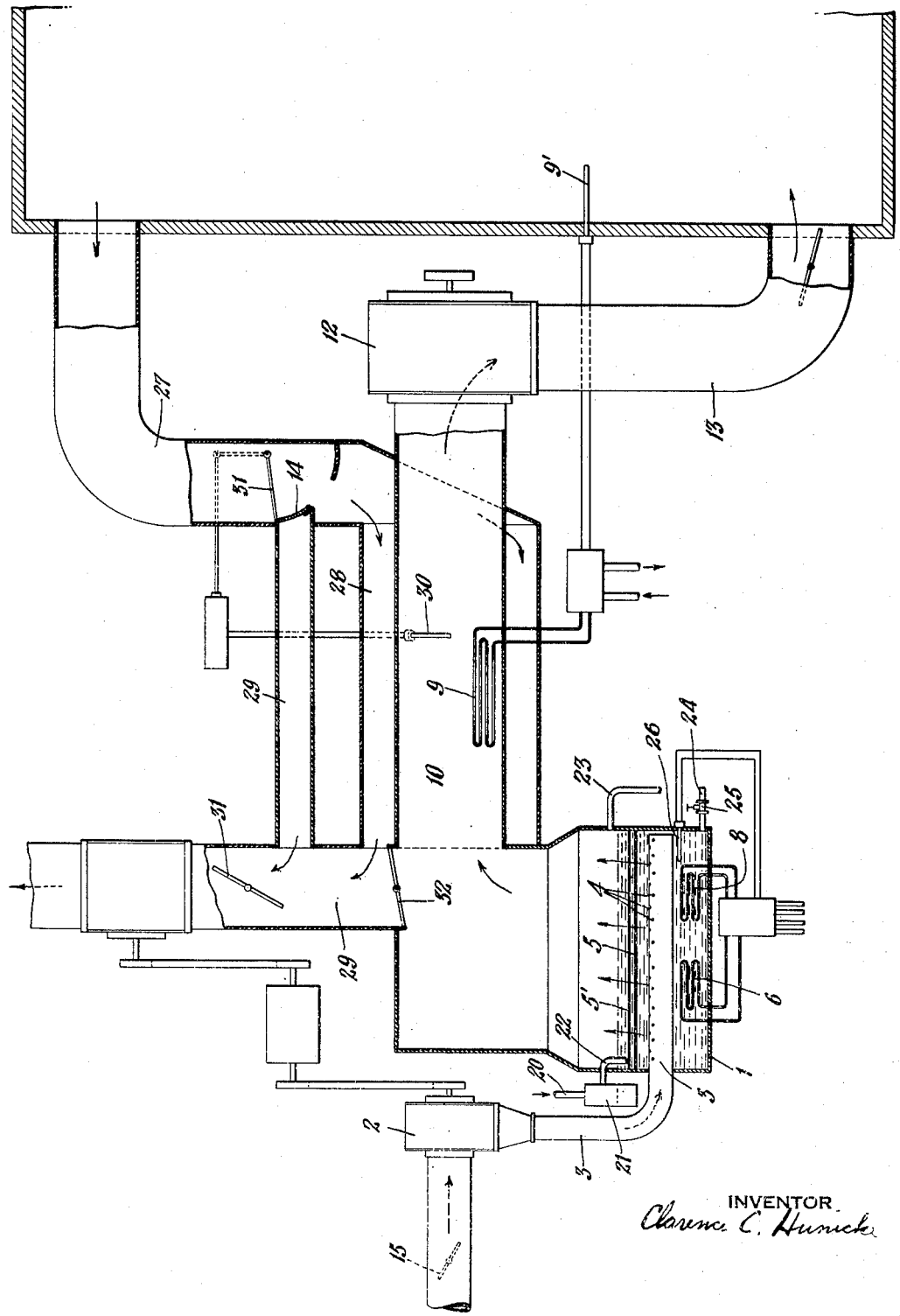
INVENTOR.
Clarence C. Hunicke Patented Nov. 27, 1934

1,982,305

UNITED STATES PATENT OFFICE 1,982,305

AIR CONDITIONING SYSTEM

Clarence C. Hunicke, Palisade, N. J.

Application September 26, 1932, Serial No. 634,806

5 Claims. (Cl. 261—122)

This invention relates to the humidifying and dehumidifying of air.

In the conditioning of air for theatres, auditoriums, homes, railway cars, etc., it is necessary to humidify the air in cold weather and to increase the temperature and to dehumidify the air in hot weather and to decrease the temperature. Various systems and means have been used for these purposes. The most common form of humidification is to pass a part or all of the air through a stream or sprays of water. Where a part is passed through a stream or sprays the conditioned air is then heated or mixed with heated air in order to secure the proper temperature and desired humidity or where dehumidification is required the air is passed through a cool spray or stream of water and then mixed with the desired amount of either fresh air or recirculated air. Such methods necessitate a considerable supply of water, a large spray chamber and are more adapted to large installations.

One of the objects of this invention is to humidify air to a predetermined degree of moisture. Another object of this invention is to dehumidify air to a predetermined degree of moisture.

A further object of this invention is to economically and efficiently condition air.

The figure shown in the drawing is a diagrammatic view of the present invention showing the apparatus connected to a building.

In carrying out my invention I propose to provide a conditioning apparatus which consists of a tank 1 containing water. The fresh air from fan 2 is forced through pipe 3 and orifices 4 to bubble up through the water and pass through a plurality of screens 5, 5'. These screens are of small mesh the upper screen 5' being of smaller mesh. These screens should be below the height of the water in tank 1. The importance of this is to prevent the carrying off of particles of water which might take place if the screen is on the surface of the water. The water in tank 1 is maintained at a constant level through supply pipe 20, reservoir 21 with a float valve therein and outlet 22. This reservoir is positioned so that the level of water therein will be the same as the level in tank 1. An overflow 23 is positioned at the proper height in tank 1 to assist in maintaining the proper water level. This overflow 23 is connected to drain 24 beyond valve 25. A heating coil may be placed in the air inlet 3 in cases where exceptional cold weather conditions are met but usually can be dispensed with. Coils 6 and 8 are utilized to maintain the water at the desired temperature. Coil 6 is the refrigerating coil and coil 8 is the heating coil automatically controlled by thermostat 26. As the general humidity desired is about 50%, if air is saturated at about 49° F. and then heated to 70° the air will have a 50% humidity. Therefore, if the temperature of the water is maintained at about 49° F. the air will be saturated at that temperature. Of course, the temperature may be varied for the percentage of saturation desired. As the normal tap water ranges from 50° to 70° F. and averages about 60° Fahrenheit and as the relative area of tank 1 is not large the control of the temperature of the water can be done economically. The change from water to water vapor has a tendency also to cool the water. The conditioned air passes upwardly into chamber 10 where coil 9 may be utilized to heat the air to the desired degree of temperature, namely, 70°. However, I propose to principally utilize for heating purposes the vented air which is withdrawn from the enclosure through conduit 27 and which passes around the outer walls of chamber 10 through bustle pipe 28 and out through vent stack 29. A thermostat 30 in chamber 10 controls valve 14 whereby the vented air is automatically apportioned to bustle pipe 28 or by-pass 29 dependent upon the heat required and the amount of heat in the waste air. If the heat in the vented air is not sufficient heating coil 9 comes into operation. The conditioned and temperature controlled air is delivered by fan or blower 12 to the enclosure through conduit 13. A damper 15 controls the quantity of fresh air admitted to the conditioning tank and a damper 31 controls the quantity of vented air removed from the enclosure. A butterfly damper 32 permits the admission of recirculated air to chamber 10 under certain conditions but this admission of recirculated air is not essential to the operation of the system. The only advantage of admitting recirculated air is in the case of a theatre between performances when there are no occupants in the enclosure and it is better to recirculate the air than to temporarily shut down the apparatus. The dampers 15, 31, may be manually or automatically regulated. It should be noted that this invention provides a method for humidifying or dehumidifying air depending upon the forcing of air below the surface of a body of water and permitting the air to rise through the body of water and breaking up the air bubbles by a series of screens. The air is in intimate surface contact during the bubbling, and the bubbles are under complete control because of their being surrounded by a liquid medium and travel in only one direction which is not the case where air is in a gaseous atmosphere. In addition, the mechanical working of the air by the breaking up of the bubbles and the elongation of the smaller globules in passing through the screens permits of a complete saturation at any desired temperature in a relatively small head of water. The smaller the sphere the greater the surface area with respect to the volume and as saturation depends upon the surface areas in contacting with each other the quick saturation in a relatively short space of travel can be seen. The height of water required for from 98 to 100% saturation at 86° F. is about 1½". The percentage of saturation is somewhat dependent upon the size of the mesh of the screens as well as the velocity of flow of the air. If the temperature of the water is maintained at the desired degree complete saturation can be obtained for that temperature. The globules of air passing through the water being of small size and being broken and reformed take up moisture to the saturation point and upon breaking through the surface of the water burst without taking with them particles of water other than water in the gaseous state. As the air leaving the conditioning apparatus is saturated at the temperature of the water the control of the entire system is easily accomplished where the temperature of saturated air is known and such temperature and saturation has been predetermined to give the desired degree of humidity at the desired temperature it is only necessary to heat the conditioned air to the desired temperature. As the saturation at the desired temperature can be effected it is only necessary to control the temperature of the water in tank 1 and the temperature in chamber or zone 10 or quantity of hot waste air surrounding chamber 10 to procure the desired effect.

By the method of bubbling the air through a body of water and breaking up the particles and the mechanical breaking up of the air bubbles into small bubbles and by the contraction of the bubbles and subsequent expansion in passing through the screens complete saturation can be obtained in a relatively small space with a relatively small quantity of water and at a depth that the fans can function with complete control of the air so that the air is saturated at the predetermined temperature of the water.

As the head of water required is not over two inches the ordinary fans or blowers that have been heretofore used may be utilized in connection with this invention. As the air rising from tank 1 is fully saturated and as it bursts through the surface of the water it does not carry with it particles of water and hence the necessity for eliminators is avoided.

It will thus be seen that with my invention as compared to the spray methods that no excess water is required, that no power is required to pump the spray water, that only a relatively small chamber is utilized and that the large spray chamber is dispensed with, that no water eliminators need be used, and that a lesser instantaneous volume of water in proportion to the volume of air is required. The use of the heat in the waste air reduces the cost of operation. A further advantage is that all the air is washed and conditioned with the elimination of dust. Furthermore, it is only necessary to condition a slightly greater amount of air than the amount of air removed for ventilation. By reason of the compactness of the system and its low cost it will find ready adaptation to homes, railway cars, vehicles, and other uses.

Although I have shown and described the method and apparatus for humidifying and dehumidifying air in connection with air conditioning it is not to be limited to this field. It may be used wherever a supply of saturated air or air of predetermined degree of humidity at a predetermined temperature is desired.

What I claim is:

1. A method for conditioning air for an enclosure which comprises saturating air at a predetermined controlled temperature by passing the air through a body of water, controlling the temperature of the body of water, then heating the saturated air to a predetermined controlled temperature by means of a controlled quantity of waste heat from the vented air from an enclosure.

2. A method of conditioning air which comprises controlling the humidity of the air by bubbling air through a body of water and controlling the temperature of the water whereby saturated air at a predetermined temperature is obtained, then raising the temperature of the treated air to the desired temperature for use by mixing with air at a higher temperature.

3. A method for humidifying and washing air which comprises bubbling air through a body of water, controlling the temperature of the water, and progressively decreasing the volume of said bubbles and thereby increasing the surface area to obtain the desired degree of saturation of the air at a predetermined temperature.

4. A method of saturating air which comprises injecting the air into a body of water of predetermined height whereby said air rises in the form of bubbles retarding and distributing the bubbles a plurality of times and reducing progressively, their size in their passage to the surface of the water and maintaining the predetermined depth of the water.

5. A method of conditioning air which comprises saturating fresh air by injecting same into a body of water of approximately two inches depth above the point of injection, controlling the pressure and velocity of the injected air whereby the injected air rises upwardly in the form of bubbles, delaying, distributing and reducing the size of the bubbles by screening, controlling the temperature of the water, maintaining the predetermined depth, and then mixing the saturated air with other air.

CLARENCE C. HUNICKE.